United States Patent [19]
Sengupta

[11] Patent Number: 5,635,434
[45] Date of Patent: Jun. 3, 1997

[54] CERAMIC FERROELECTRIC COMPOSITE MATERIAL-BSTO-MAGNESIUM BASED COMPOUND

[75] Inventor: Louise Sengupta, Warwick, Md.

[73] Assignee: The United States of America as represented by the Secretary of the Army, Washington, D.C.

[21] Appl. No.: 528,629

[22] Filed: Sep. 11, 1995

[51] Int. Cl.$^6$ ................................................ C04B 35/46
[52] U.S. Cl. ...................... 501/138; 501/137; 501/136; 501/135; 501/120; 501/121
[58] Field of Search .................... 501/137, 121, 501/120, 135, 136, 138

[56] References Cited

U.S. PATENT DOCUMENTS 5,427,988  6/1995  Sengupta et al. .................. 501/137

*Primary Examiner*—Melissa Bonner
*Attorney, Agent, or Firm*—Freda L. Krosnick; Muzio B. Roberto

[57] ABSTRACT

Ceramic ferroelectric composite material-BSTO-Magnesia based compounds having a low dielectric constant, low loss tangent and high tunability are disclosed. The composite material comprises Barium Strontium Titanate (BSTO) and a magnesia compound selected from the group consisting, $MgZrO_3$, $MgAl_2O_4$, and $MgTiO_3$. The preferred composite is represented by $Ba_{1-x}Sr_xTiO_3$-magnesia compound, wherein x is greater than 0.00, but less than or equal to 0.75, and wherein the percent weight ratio between BSTO and magnesia compound ranges from approximately 99%–40% and 1%–60%, respectively. The novel materials possess superior electronic properties, and they may be employed in various antenna systems.

4 Claims, 2 Drawing Sheets

Dielectric Constants versus Oxide Content (wt%) for the BSTO (Ba=0.60)-Magnesia Based Compounds measured at 1 KHz.

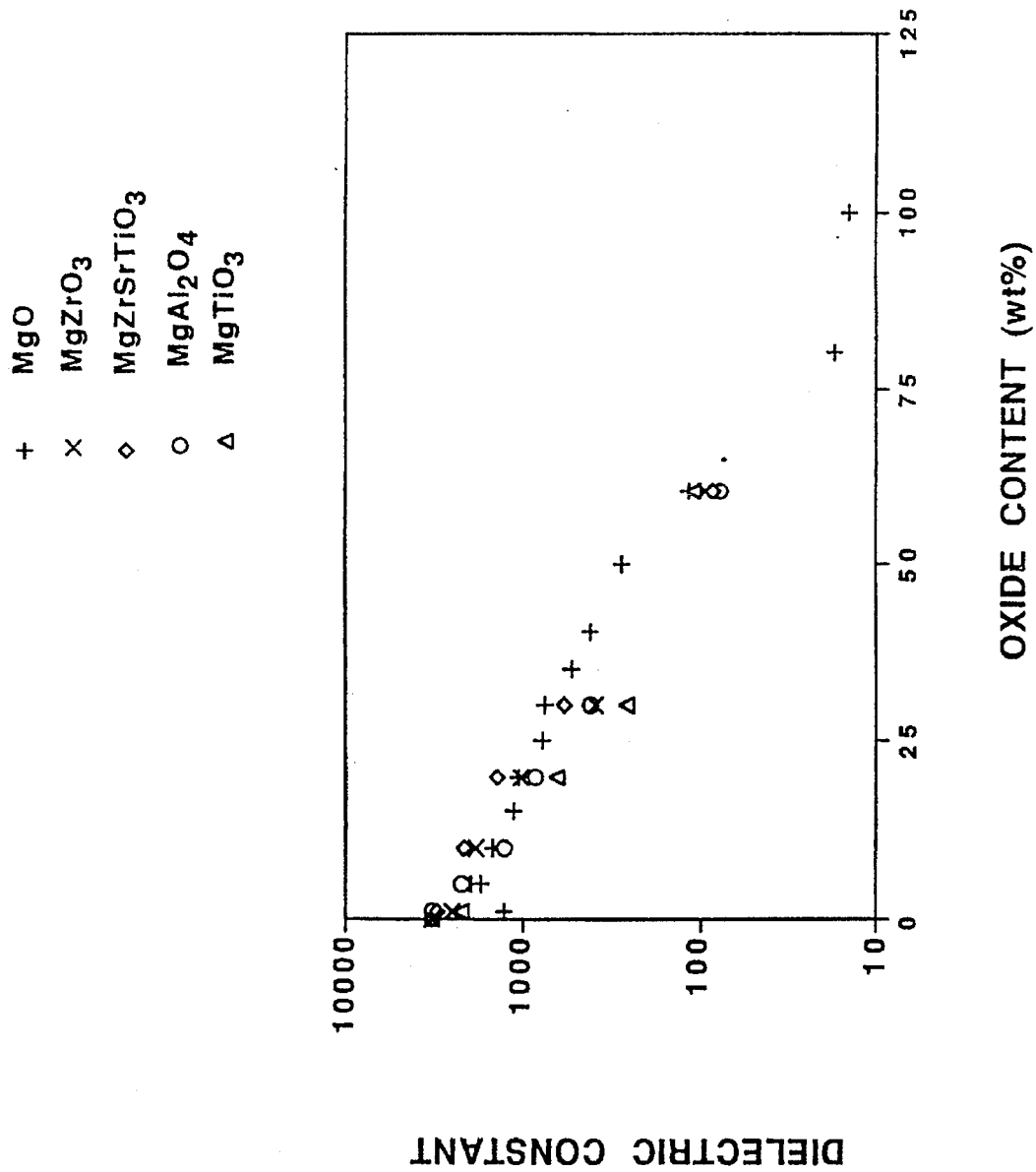
Figure 1. Dielectric Constants versus Oxide Content (wt%) for the BSTO (Ba=0.60)-Magnesia Based Compounds measured at 1 KHz.

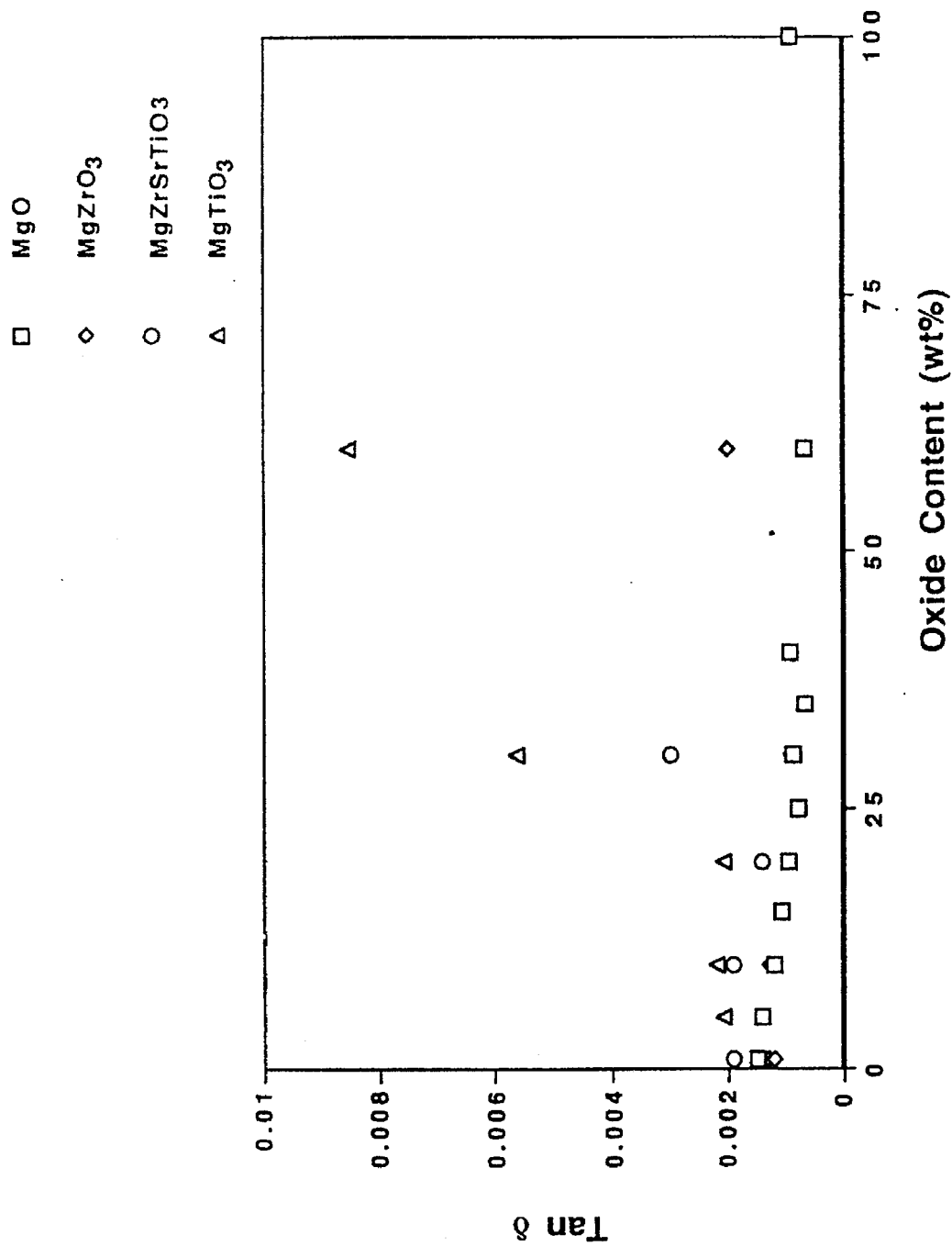
Figure 2. Loss Tangents versus Oxide Content (wt%) for the BSTO (Ba=0.60)-Magnesia Based Compounds (BSTO-MgAl$_2$O$_4$ not shown) measured at 1 KHz.

CERAMIC FERROELECTRIC COMPOSITE MATERIAL-BSTO-MAGNESIUM BASED COMPOUND

TECHNICAL FIELD

The invention relates generally to a ceramic ferroelectric composite material, and, more particularly, to a ceramic ferroelectric composite material consisting of a Barium Strontium Titanate and MgO based compound for improving electronic properties for use in phased array antenna systems.

BACKGROUND ART

This patent application is associated with the materials cited in U.S. Pat. No. 5,312,790 granted on May 17, 1994, entitled "Novel Ceramic Ferroelectric Material", U.S. Pat. Ser. No. 08/207,446 filed Mar. 7, 1994, and entitled "Novel Ceramic Ferroelectric Composite Material—BSTO-MgO", now U.S. Pat. No. 5,427,998; U.S. Pat. Ser. No. 08/207,447, filed Mar. 7, 1994 and entitled "Novel Ceramic Ferroelectric Composite Material—BSTO-$ZrO_2$", now U.S. Pat. No. 5,486,491, and U.S. patent Ser. No. 08/215,877, filed Mar. 22, 1994 and entitled "Novel Ceramic Ferroelectrics for Phased Array Antennas". The present invention is specifically an expansion and improvement of the materials cited in the above-referenced U.S. Pat. No. 5,427,988, entitled, "Novel Ceramic Ferroelectric Composite Material—BSTO-MgO". These patent applications are commonly owned by the U.S. Government as represented by the Secretary of the Army.

A need exists for the fabrication of ceramic materials having improved electronic properties which may be adjusted for a particular, intended use. The present invention deals with novel ceramic ferroelectric materials having ideal properties for use, for example, in phased array antenna systems.

The ferroelectric materials are a replacement for the more expensive current driven ferrites which are currently used in phased array antennas. The invention outlines ferroelectric materials which provide adequate phase shift with a minimal insertion loss.

Current attempts to use ferroelectric materials employ porous ceramics, whose properties are less than ideal for their intended application. Porous ceramics of the $Ba_{1-x}Sr_xTiO_3$ (BSTO) type are commonly employed in ceramic phase shifter antennas. However, these materials display certain deficiencies due to processing difficulties, cost and poor overall electronic and microwave properties. These deficiencies include electronic inhomogeneity, structural weakness, reproducibility, and large loss tangents.

Barium Strontium Titanate ($BaTiO_3$—$SrTiO_3$), also referred to herein as BSTO, has been known to be used for its high dielectric constant (approximately ranging from 200 to 6,000) in various antenna applications. This is set forth by Richard W. Babbitt et al. in their publication, "Planar Microwave Electro-Optic Phase Shifters," Microwave Journal, Volume 35 (6), (June 1992). This publication concludes that there exists a need for additional research to be conducted in the materials art to yield materials having more desirable electronic properties.

Although the employ of BSTO in phase shifters is known, nowhere in the technical arena of ceramic arts has there been any suggestion of modifying BSTO, or combining BSTO with additives, in the manner described herein. Moreover, the specific BSTO combinations, which have enhanced electronic properties, are deemed novel.

SUMMARY OF THE INVENTION

Accordingly, it is an object of the present invention to provide a ferroelectric material suitable for, but not limited to, use in phased array antenna systems.

It is a further object of the present invention to fabricate a material exhibiting enhanced electronic properties.

It is still a further object of the present invention to provide a ferroelectric material having a moderate dielectric constant, an extremely low loss and a high tunability.

It is a further object of the present invention to provide materials having electronic properties, wherein said electronic properties can be adjusted in such a manner that they can be employed in any discrete element phase shifter design.

It is a further object of the present invention to provide a ferroelectric material which is easily machinable.

Still, it is further object herein to provide a ferroelectric material which possesses superior electronic properties at dc, microwave and millimeter wave operating frequencies.

The present invention provides for improved materials which exhibit electronic properties which can be adjusted for use, for example, in any discrete element phase shifter design, i.e. planar microstrip, wave guide geometrics or parallel plate structure. The invention herein is superior to other currently used ferroelectric materials in the art. The invention is designed to provide tunable materials with an extremely minimal insertion loss. Therefore, these materials can be used in millimeter wave applications with, for example, a 77 GHz frequency range.

More particularly, the present invention provides a ceramic ferroelectric composite material consisting essentially of Barium Strontium Titanate (BSTO) and a magnesia compound selected from the group consisting of a $MgZrO_3$, a $MgAl_2O_4$, and a $MgTiO_3$. The Barium Strontium Titanate is represented as $Ba_{1-x}Sr_xTiO_3$ in which x is greater than 0.0 but less than or equal to 0.75. The Barium Strontium Titanate and the magnesia compound are present in amounts to provide a composite having a low dielectric constant, low loss tangent and high tunability. The weight ratios of Barium Strontium Titanate to magnesia compound may range from 99%–40% wt. BSTO to 1%–60% wt. magnesia compound.

The subject matter of the present invention relates to the fabrication of specific ceramic materials (either bulk ceramic or pulsed laser deposited (PLD) thin films) which have sought after properties in, for example, phased array antenna systems. The sought after properties include (1) a moderate dielectric constant; (2) a low loss; and (3) high tunability. Dielectric constant is related to the energy storage in the material; whereas, the loss tangent is related to the power dissipation in the same material. In general, the dielectric function is a complex quantity with $\epsilon = \epsilon' - i\epsilon''$; and the loss tangent, $\tan \delta = \epsilon''/\epsilon \approx 0.001$ or less.

Tunability may be defined as ((dielectric constant with no applied voltage)−(dielectric constant with an applied voltage))/(dielectric constant with no applied voltage). For simplicity purposes, tunability can be represented as $$T = \left( \frac{X-Y}{X} \right) \text{ wherein}$$

X = (dielectric constant with no applied voltage)
Y = (dielectric constant with an applied voltage).

The tunability of a material under an electric field of 2.0 V/micron can range from 1–60% depending upon the composition of the materials employed.

The materials herein combine Barium Strontium Titanate (BaTiO$_3$-SrTiO$_3$) with any magnesia based oxide. These bulk ceramic materials, encompassed by the present invention, are superior in that they are homogeneous, extremely dense, easily machinable, and possess superior electronic properties at both dc and microwave operating frequencies. Moreover, the ceramics herein have low water absorptivity. Typically these materials will absorb less than 2% by weight of liquid therein. Hence, the materials within the scope of the present invention are environmentally stable—for example, they have good moisture and temperature stability.

Although other combinations of electrically active and inactive components have been commonly employed in conjunction with piezoelectric materials, nowhere has the combination of the present invention been described. More specifically, the present invention is the first teaching wherein BSTO is combined with magnesium compounds in order to adjust the electronic properties and phase shifting ability of a material. Specifically, nowhere has BSTO been combined with these magnesia compounds to adjust the electronic properties of the material for use in a phase array antenna system. Aside from the combination of BSTO with magnesia compounds being novel, its application in phased array antenna systems is an application never suggested in the prior art.

Replacing the currently employed materials with the novel ferroelectric composite described in the present invention will improve the overall performance of a phased array antenna system as well as reduce the cost, weight and size of the antenna per se.

The means to achieve these and other objects of the present invention will be apparent from the following detailed description of the invention.

BRIEF DESCRIPTION OF DRAWINGS

FIG. 1 is a graph showing the relationship between the dielectric constants and the oxide content of the various oxide additives.

FIG. 2 is a graph showing the relationship between the loss tangents and oxide content for the BSTO-magnesia based compounds.

BEST MODE FOR CARRYING OUT THE INVENTION

The present invention encompasses the fabrication of novel ceramic materials having enhanced electronic properties. These materials are superior to other currently employed ferroelectric materials.

When considering the optimization of electronic properties of ceramic materials, the following parameters must be taken into consideration.

(1) Dielectric Constant: Ideally the dielectric constant should be in the range from approximately 30 to 2500. The lower dielectric constants are preferable since the impedance matching for these becomes easier. The low dielectric constants (around 50–200) do not decrease the phase shifting ability of the material if a sufficient length of material is used (then a high dielectric constant is not needed). Also, as insertion loss (loss of energy getting into the ceramic) does not depend upon the dielectric constant, it is not effected by lowering the dielectric constant. Since the loss tangent (tan δ) increases with increasing dielectric constant (for these ferroelectric materials), lower dielectric materials tend to have lower loss tangents and therefore, less insertion loss. However, even composites of BSTO-MgO, BSTO-MgZrO$_3$, BSTO-MgTiO$_3$, wherein Ba (1−x)= 0.60, that have higher dielectric constants (above approximately 800) have low loss (less than 0.003).

(2) Low Loss: The loss tangent (intrinsic to the material) serves to dissipate or absorb the incident microwave energy and therefore, is most effective in this device when the loss tangent is in the range of 0.001 or less. The low loss tangent serves to decrease the insertion loss and hence increase the phase shifter per decibel of loss. The operating frequency is controlled by the loss tangent. Extremely low loss materials (0.0007) can be used at millimeter wave range frequencies.

(3) High Tunability: The tunability of a particular material effects the material's electronic properties by how much the dielectric constant changes with applied voltage. The amount of phase shifting ability is directly related to the tunability; therefore, higher tunabilities are desired. The tunability can be increased to some extent by decreasing the sample thickness. The insertion loss is inversely related to the tunability so that the larger the tunability, the smaller the insertion loss. Optimum electronic properties would have tunabilities ranging from 4 to 50% (depending upon other factors, dielectric constant and loss tangent).

The materials within the scope of the present invention fall within the optimum characteristics outlined above. These materials are Ba$_{1-x}$Sr$_x$TiO$_3$-MgO, BSTO-MgZrO$_3$, BSTO-MgAl$_2$O$_4$, and BSTO-MgTiO$_3$ wherein x is greater than 0.0 but less than or equal to 0.75. These formulations may be referred to as Barium Strontium Titanate and magnesia based compounds. The weight ratios of Barium Strontium Titanate (BSTO) to the magnesia compounds may range from 99% wt.–40% wt. BSTO to 1% wt.–60% wt., MgZrO$_3$, MgAl$_2$O$_4$ or MgTiO$_3$. A typical composition within the present invention may comprise 70% by weight BSTO (wherein x=0.40) and 30 wt % MgZrO$_3$, 30 wt % MgAl$_2$O$_4$ or 30 wt % MgTiO$_3$. BSTO-30 wt % MgZrO$_3$ has a dielectric constant of 389.06, loss tangent of 0.0009, and a tunability of 1.70 (applied electric field=1.34 V/micron). V/micron). BSTO-30 wt % MgAl$_2$O$_4$ has a dielectric constant of 413.04 loss tangent of 0.0313, and a tunability of 22.72% (applied field—2.00 V/micron). BSTO 30 wt % MgTiO$_3$ has a dielectric constant of 263.52, loss tangent of 0.0056, and a tunability of 11.52% (applied field=2.00 V/micron).

Magnesium and/or magnesia based compounds are used herein to adjust the electronic properties of BSTO. These compounds even at low doping levels (1–10% wt.), lower the Curie temperature (temperature at which the peak dielectric constant occurs) as reported in the following tables. At higher levels, the compounds lower the material's dielectric constant and loss to meet the requirements for various applications, for example, in the antenna arts. The electronic properties of the formulation herein can be adjusted for use in any discrete element phase shifter design, such as planar microstrip, waveguide geometries or for use in a parallel plate structure.

It has been found that with current processing controls that the electronic properties of BSTO-magnesia compound are reproducible to within 2%. Hence, once a specific formulation of the BSTO-magnesia compound is determined to be suitable for a specific purpose, the material properties can be accurately reproduced.

The preparation of BSTO-magnesia compound may be accomplished by obtaining powders of Barium Titanate and Strontium Titanate. These powders are ball milled in a conventional manner in an organic solvent. This particular mixture is then air-dried and calcined at approximately 200 degrees below the sintering temperature for several hours. The resultant BSTO is then mixed with the magnesia compound of choice in the desired weight percentage and re-ball milled in an organic solvent with a binder. The final mixture is then air-dried, once again, and dry-pressed at approximately 7,000 p.s.i. The final samples are sintered in air. Proper electroding of the composite ceramics must be done. The samples were screen printed with a FERRO#3350, (Electronic Materials Division, Santa Barbara, Calif.) silver conductive ink.

Tables 1 and 2 set forth the various properties of BSTO-$MgZrO_3$, BSTO-$MgAl_3O_4$, and BSTO-$MgTiO_3$ wherein the formulation is represented by $Ba_{0.60}Sr_{0.40}TiO_3$—$MgZrO_3$, etc . . . . These properties were obtained from the measured immersion densities (immersion in ethanol).

TABLE 1

| $MgZrO_3$ Content (wt. %) | Density (g/cc) | % Porosity | % Absorption |
|---|---|---|---|
| 1.0 | 4.790 | 11.075 | 1.771 |
| 10.0 | 5.439 | 7.692 | 1.252 |
| 20.0 | 5.090 | 4.545 | 0.725 |
| 30.0 | 4.650 | 3.268 | 0.539 |
| 60.0 | 4.496 | 8.466 | 1.471 |

TABLE 2

| $MgAl_2O_4$ Content (wt. %) | Density (g/cc) | % Porosity | % Absorption |
|---|---|---|---|
| 1.0 | 5.16 | 3.63 | 0.57 |
| 5.0 | 5.17 | 7.81 | 1.28 |
| 10.0 | 3.74 | 2.08 | 1.07 |
| 20.0 | 4.94 | 3.23 | 0.53 |
| 30.0 | 2.73 | 6.64 | 2.03 |
| 60.0 | 2.88 | 4.27 | 1.06 |

TABLE 3

| $MgTiO_3$ Content (wt. %) | Density (g/cc) | % Porosity | % Absorption |
|---|---|---|---|
| 1.0 | 4.38 | 7.91 | 1.53 |
| 5.0 | 4.59 | 16.67 | 3.41 |
| 10.0 | 3.89 | 13.44 | 3.12 |
| 20.0 | 3.66 | 4.27 | 0.95 |
| 30.0 | 4.22 | 9.85 | 2.02 |
| 60.0 | 3.30 | 9.48 | 2.48 |

As reported in the above tables the specimens have low % absorption and porosity and therefore have a low probability of aging effects to environmental conditions.

The electronic properties of some of the formulations within the present invention are set forth in Tables 3, 4, 5 and 6. The representative formulations for which electronic properties are tabulated are for BSTO (Ba=0.60) with varying magnesium content. Frequency used was 1 kHz and dielectric constants have been corrected for edge (fringe) capacitance.

TABLE 4

| BSTO (Ba = 0.60) and $MgZrO_3$ | | | | | |
|---|---|---|---|---|---|
| $MgZrO_3$ Content (wt %) | Dielectric Constant | Loss Tangent | % Tunability | Electric Field (V/μm) | Curie Temp (C.) |
| 0.0 | 3299.1 | 0.0195 | 19.91 | 0.73 | 10 |
| 1.0 | 2515.3 | 0.0011 | 12.24 | 1.14 | −15 |
| 10.0 | 1868.9 | 0.0013 | 11.63 | 1.56 | −20 |
| 20.0 | 1016.0 | 0.0327*** | 10.89 | 1.33 | ←−55 |
| 30.0 | 389.06 | 0.0009 | 1.607 | 1.34 | ←−55 |
| 60.0 | 93.591 | 0.0022 | 0.450 | 0.99 | ←−55 |

TABLE 5

| BSTO (Ba = 0.60) and $MgAl_2O_4$ | | | | | |
|---|---|---|---|---|---|
| $MgAl_2O_4$ Content (wt %) | Dielectric Constant | Loss Tangent | % Tunability | Electric Field (V/μm) | Curie Temp (C.) |
| 0.0 | 3299.1 | 0.0195 | 19.91 | 0.73 | 10 |
| 1.0 | 3299.1 | 0.0066 | 35.24 | 2.00 | −10 |
| 5.0 | 2267.4 | 0.0050 | 29.78 | 2.00 | 0 |
| 10.0 | 1264.6 | 0.0057 | 19.94 | 2.00 | −25 |
| 20.0 | 842.23 | 0.0146 | 19.93 | 2.00 | −20 |
| 30.0 | 413.04 | 0.0313 | 22.72 | 2.00 | −10 |
| 60.0 | 76.700 | 0.0125 | 17.00 | 2.00 | 0 |

TABLE 6

| BSTO (Ba = 0.60) and $MgTiO_3$ | | | | | |
|---|---|---|---|---|---|
| $MgTiO_3$ Content (wt %) | Dielectric Constant | Loss Tangent | % Tunability | Electric Field (V/μm) | Curie Temp (C.) |
| 0.0 | 3299.1 | 0.0195 | 19.91 | 0.73 | 10 |
| 1.0 | 2256.5 | 0.0014 | 30.96 | 2.00 | −17 |
| 5.0 | 2193.2 | 0.0021 | 17.89 | 2.00 | −15 |
| 10.0 | 1386.5 | 0.0022 | 18.69 | 2.00 | −15 |
| 20.0 | 649.90 | 0.0021 | 15.23 | 2.00 | −13 |
| 30.0 | 263.52 | 0.0056 | 11.52 | 2.00 | −50 |
| 60.0 | 108.25 | 0.0085 | 3.7 | 2.00 | ←−55 |

Note:
*The magnitude of the loss tangents reported approach the limit of measurement capability of the test apparatus; therefore, actual loss tangents are in some cases less than these values.
**Samples arched due to electroding material penetrating into ceramic body
***Poor contact, actual loss tangent less than above.

As shown in the above tables (3–6), generally, the dielectric constants decrease with increase in oxide content, and the tunability decreases slowly with increase in oxide content. In fact, the BSTO-$MgAl_2O_4$ composite exhibit high tunabilities (>10%) up to 60 wt % oxide content which is not the case for the other composites reported in these tables.

However, at similar electric field strengths the tunability of the 60 wt % BSTO-MgAl$_2$O$_4$ composite is nearly twice that of the 60 wt % BSTO-MgZrO, BSTO-MgZrO, and BSTO-MgTiO. This may be due to the fact that the Curie temperature of the 60 wt % BSTO-MgAl$_2$O$_4$ composite is 0° C. On the other hand, the Curie temperatures for the 60 wt % BSTO-MgO, BSTO-MgZrO$_3$, and BSTO-MgTiO$_3$ composites are all very low, <−50° to <−55° C., (in the far paraelectric region). Another significant factor which affects the tunability is the size of the oxide additive. The size of ZrO$_2$ is much greater than the size of MgO. Therefore, composites containing ZrO$_2$, and BSTO-MgZrO$_3$ (which also contains ZrO$_2$), will have much less tunability at high additive content (60 wt %) due to lack of connectivity between the BSTO in the composites. The observed tunabilities for these materials is <2.0%. The differences in the tunabilities of the 60 wt % oxide content composites could also be due to the fact that the BSTO-MgAl$_2$O$_4$ compound do not exhibit secondary phases, whereas the other composites form multiple secondary phases. These phases are non-ferroelectric tending to inhibit tunability at high additive contents.

The dielectric constants versus oxide content of the various oxide additives are shown in FIG. 1. The dielectric constant of MgZrO$_3$ as expected are in the same range and have the same compositional trends as their constituents namely MgO and ZrO$_2$.

If the antenna application does not require exceedingly high tunability (where tunability can be increased with a decrease in sample thickness for a given externally applied electric field, then those compositions with lower dielectric constants are probably likely to produce less impedance mismatch and may possess lower loss tangents.

The loss tangents versus oxide content for the BSTO-magnesia based compounds are shown in FIG. 2. The loss tangents for all the samples shown in the figure are less than 0.009 and most of the specimens have loss tangents less than 0.002. However, the loss tangents of the BSTO-MgAl$_2$O$_4$ composites are greater than 0.01 and greater than the loss tangents of all the other composites reported here. Again, the value of the Curie temperature for these composites may contribute to the higher losses evident in these specimens. In fact, the Curie temperature and the loss of these composites is much closer to that of undoped BSTO (Ba=0.60).

EXAMPLE 1

Powder forms of Barium Titanate and Strontium Titanate were obtained from Ferro Corp., Transelco Division, Pen Yah, N.Y. (product nos. 219–6 and 218, respectively). The powders were stoichiometrically mixed in a slurry of ethanol and ball-milled using alumina $\frac{3}{16}$" grinding media. This was performed for 24 hours. The mixture was subsequently air dried and calcined for 5 hours at approximately 1100° C. The resulting BSTO was mixed with either MgO (johnson Matthey Electronics, Ward Hill, Mass., produce number 12287), or MgZrO$_3$ (Johnson Matthey Electronics, Ward Hil, Mass., product number 12287), or MgAl$_2$O$_4$ (Ceralox, Tucson, Ariz., product no. 12068-51-8) or MgTiO$_3$ (Ferro Corp., Transelco Division, Pen Yan, N.Y., product no. 216) in the proper weight percent. These mixtures were then re-ball milled in a slurry of ethanol using a $\frac{3}{16}$" alumina grinding media for an additional 24 hours.

To the resulting BSTO/Magnesia mixture, Rhoplex B-60A (Rohm and Haas Co., Philadelphia, Pa.), which is a 3% wt. organic binder consisting of an aqueous emulsion of acrylic polymer, was added to improve green body strength and to permit sample fabrication in greater dimensions. (Green body strength refers to the ability of unfired material to remain intact and to withstand handling; it also implies better densities in the unfired pieces.) Other binders and plasticizers may be added at this point to allow extrusion molding or for fabrication of tape-cast sheets of material.

The material is then air-dried and dry-pressed to a pressure of approximately 7,000 p.s.i. Sintering schedules are ascertained by employing a deflectometer such as a Mitutoyo digimatic indicator and miniprocessor (Mitutoyo Corp., Paramus, N.J.). The final samples were fired in various furnaces and the densities of the samples were found to be reproducible to within 1 and 2%.

The properties of the resulting BSTO—Magnesia Compound samples are set forth in Tables 1, 2, 3, 4 and 5 above.

While particular embodiments of the present invention have been shown and described, it will be obvious to those skilled in the art that changes and modifications may be made without departing from this invention. For example, the invention may be modified to include ceramic-ceramic composites of BSTO and other magnesia based compounds or other low dielectric constant materials depending upon the particular requirements of the intended application. Among some of the other low dielectric constant materials which may be combined with BSTO are alumina microballoons, alumina fibers or fabric, silicon dioxide and other low dielectric constant (2'<20), low dielectric loss oxides (tan δ<0.005). (Alumruns microballoons are hollow spheres of approximately 1–5 microns in diameter and are alreadysintered components (BSTO/ceramic)—the electronic properties of a composite employing alumina microballoon will most likely differ from composites employing alumina powder. Alumina fibers or fabric, when employed in the composite within the scope of the present invention, may possess electronic properties different from composites which employ alumina powder. This is due to the fact that this form of alumina is most likely to be in sintered form; and the fibers or fabric alumina produce different connectivity between the BSTO particles.) Also any BSTO composite consisting of the combination of the compounds listed above may include composites which are suitable for applications in electronic devices.

I claim:

1. A ceramic ferroelectric composite material-BSTO based compound consisting essentially of:

Barium Strontium Titanate, said Barium Strontium Titanate represented as Ba$_{i31-x}$Sr$_x$TiO$_3$; wherein x is greater than 0.0 but less than or equal to 0.75;

and a magnesia compound selected from the group consisting of a NgZrO$_3$, MgAl$_2$O$_4$, and a MgTiO;

wherein said Barium Strontium and said magnesia compound having a low dielectric constant, low low loss tangent and high tunability.

2. The ceramic ferroelectric composite material-BSTO-Magnesia based compounds according to claim 1, wherein said Barium Strontium Titanate is Ba$_{1-x}$SrTiO$_3$, wherein x=0.40.

3. The ceramic ferroelectric composite material-BSTO-Magnesia based compounds according to claim 1, wherein the weight ratio of said Barium Strontium Titanate to said magnesia compound selected from the group consisting of said MgZrO$_3$, said MgAl$_2$O$_4$, and said MgTiO$_3$, ranges from approximately 99%–40% said Barium Strontium Titanate to approximately 1%–60% said magnesia compound.

4. The ceramic ferroelectric composite material-BSTO-Magnesia based compounds according to claim 3, wherein the ratio of said Barium Strontium Titanate to said Magnesia compound selected from the group consisting of said MgZrO$_3$, said MgAl$_2$O$_4$, and said MgTiO$_3$ is approximately 70% wt. said Barium Strontium Titanate to approximately 30% said magnesia compound.

* * * * *